(12) United States Patent
Hsu et al.

(10) Patent No.: US 8,669,728 B2
(45) Date of Patent: Mar. 11, 2014

(54) ANGLE DETECTION APPARATUS AND METHOD FOR ROTOR OF MOTOR

(75) Inventors: Yi-Min Hsu, Taichung (TW);
Chung-Hui Yeh, New Taipei (TW);
Pei-Sheng Tsu, New Taipei (TW)

(73) Assignee: System General Corp., New Taipei (TW)

( * ) Notice: Subject to any disclaimer, the term of this patent is extended or adjusted under 35 U.S.C. 154(b) by 234 days.

(21) Appl. No.: 13/352,295

(22) Filed: Jan. 17, 2012

(65) Prior Publication Data

US 2013/0181644 A1    Jul. 18, 2013

(51) Int. Cl.
*H02P 6/16* (2006.01)
*H02K 29/10* (2006.01)

(52) U.S. Cl.
USPC ............ 318/400.04; 318/400.02; 318/400.21; 318/685; 324/207.5

(58) Field of Classification Search
USPC .......... 318/400.01, 400.02, 400.04, 603, 685, 318/400.21, 696; 324/207.25
See application file for complete search history.

(56) References Cited

U.S. PATENT DOCUMENTS

| 3,704,659 | A | * | 12/1972 | Low et al. | 396/463 |
|---|---|---|---|---|---|
| 4,001,812 | A | * | 1/1977 | Testa et al. | 341/124 |
| 4,295,085 | A | * | 10/1981 | Lafuze | 318/721 |
| 4,412,207 | A | * | 10/1983 | Sinclair | 341/139 |
| 4,439,831 | A | * | 3/1984 | Sinclair | 318/600 |
| 4,455,529 | A | * | 6/1984 | Sinclair | 324/339 |
| 4,489,388 | A | * | 12/1984 | DeGroot et al. | 342/452 |
| 4,949,027 | A | * | 8/1990 | Baur | 318/696 |
| 5,033,425 | A | * | 7/1991 | Kadomukai et al. | 123/192.1 |
| 7,394,229 | B2 | * | 7/2008 | Lim et al. | 322/59 |
| 8,471,506 | B2 | * | 6/2013 | Manabe | 318/400.04 |
| 8,471,518 | B2 | * | 6/2013 | Nishiguchi et al. | 318/800 |
| 2006/0232069 | A1 | * | 10/2006 | Lim et al. | 290/1 R |
| 2010/0038907 | A1 | * | 2/2010 | Hunt et al. | 290/7 |
| 2011/0101899 | A1 | * | 5/2011 | Manabe | 318/400.04 |
| 2011/0193509 | A1 | * | 8/2011 | Ooyama et al. | 318/503 |
| 2011/0266992 | A1 | * | 11/2011 | Nishiguchi et al. | 318/807 |
| 2012/0139460 | A1 | * | 6/2012 | Senkou et al. | 318/400.02 |
| 2013/0033205 | A1 | * | 2/2013 | Furukawa et al. | 318/400.02 |
| 2013/0066501 | A1 | * | 3/2013 | Oyama et al. | 701/22 |

* cited by examiner

*Primary Examiner* — Paul Ip
(74) *Attorney, Agent, or Firm* — Jianq Chyun IP Office (57) ABSTRACT

An angle detection apparatus for a rotor of a motor includes a period counter, a step period generator, and an angle generator. The period counter receives a rotor sensing signal, and calculates a plurality of time ranges of a plurality of pulses of the rotor sensing signal. The step period generator generates a ratio value and an error signal according to an average time range value of the time ranges and a set value. The step period generator further adjusts the ratio value according to the error signal, and generates a step time according to the adjusted ratio value and the average time range value. The angle generator receives the step time and the rotor sensing signal, and obtains an angle detection result according to the rotor sensing signal and the step time.

18 Claims, 6 Drawing Sheets

ANGLE DETECTION APPARATUS AND METHOD FOR ROTOR OF MOTOR

BACKGROUND OF THE INVENTION

1. Field of the Invention

The present invention generally relates to an angle detection apparatus and method for a rotor of a motor, in particular, to an angle detection apparatus and method for a rotor of a Brushless Direct Current (BLDC) motor.

2. Description of Related Art

Figure 1:
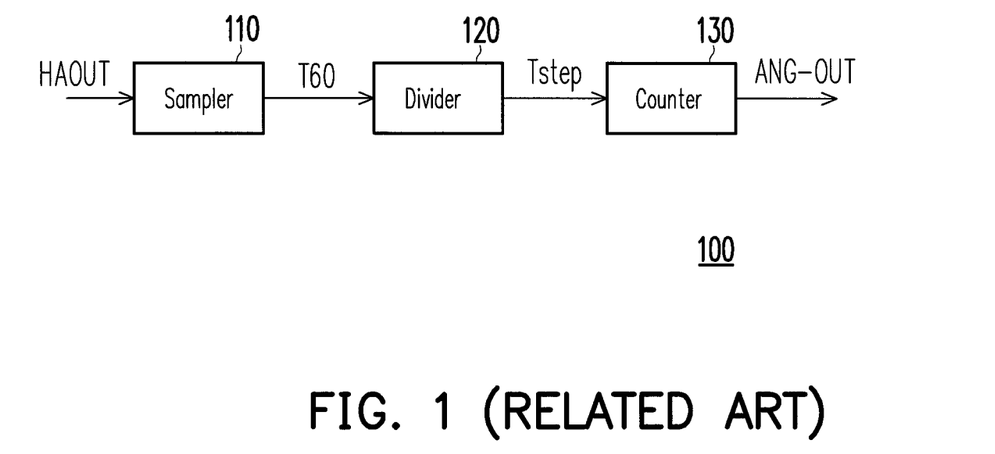
FIG. 1 is a block diagram of an angle detection apparatus 100 for a rotor of a motor in the prior art.

Referring to FIG. 1, FIG. 1 is a block diagram of an angle detection apparatus 100 for a rotor of a motor in the prior art. A conventional angle detection apparatus 100 for a rotor of a BLDC motor includes a sampler 110, a divider 120, and a counter 130. The sampler 110 receives a rotor sensing signal HAOUT generated by a Hall sensor module on a rotor of a motor. The rotor sensing signal HAOUT is a periodic signal having a plurality of pulses. The sampler 110 samples a time distance between two adjacent pulses of the rotor sensing signal HAOUT through a high frequency clock signal, and calculates a time range T60 between the two adjacent pulses of the rotor sensing signal HAOUT by using a sampled result (the number of the clock signals included in the time range between the two pulses).

The divider 120 is coupled to the sampler 110, performs a division operation on the received time range T60 to generate a step time Tstep, and provides the step time Tstep to the counter 130. The counter 130 calculates an angle ANG-OUT of the rotor according to the rotor sensing signal HAOUT by using the step time Tstep.

Figure 2:
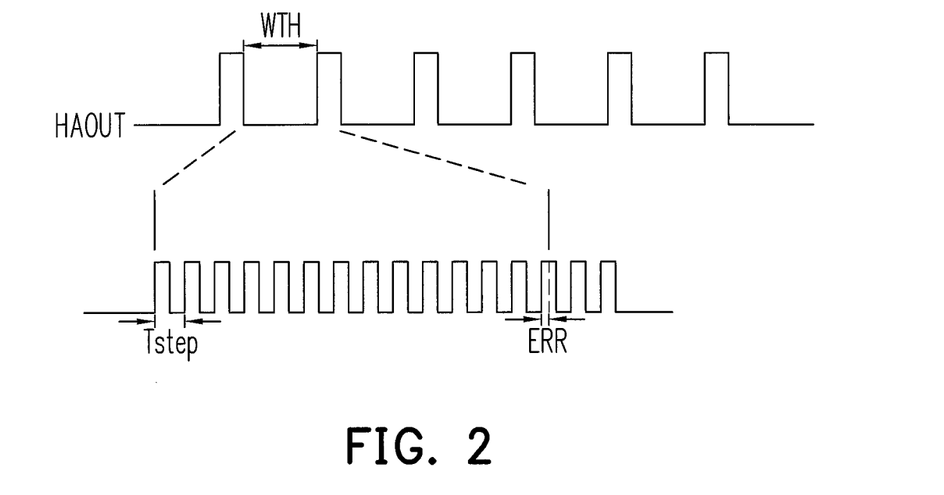
FIG. 2 is a schematic view of a counter 130 using a step time Tstep to calculate an angle ANG-OUT of a rotor.

Referring to FIG. 1 and FIG. 2, FIG. 2 is a schematic view of the counter 130 using the step time Tstep to calculate the angle ANG-OUT of the rotor. The resolution of a step time Tstep is limited, and when a time range WTH is not an integer multiple of the step time Tstep, the counting action of the counter 130 has an error ERR. The error ERR is accumulated continuously when the rotor of the motor runs continuously. That is to say, as the motor operates longer, the accuracy of the angle detection for the rotor of the motor gets poorer.

SUMMARY OF THE INVENTION

Accordingly, the present invention is directed to an angle detection apparatus and method for a rotor of a motor, so as to detect a rotation angle of the rotor of the motor more accurately.

The present invention provides an angle detection apparatus for a rotor of a motor, which includes a period counter, a step period generator, and an angle generator. The period counter receives a rotor sensing signal, and calculates a plurality of time ranges of a plurality of pulses of the rotor sensing signal. The step period generator is coupled to the period counter, and generates a ratio value and an error signal according to an average time range value of the time ranges and a set value. The step period generator further adjusts the ratio value according to the error signal, and generates a step time according to the adjusted ratio value and the average time range value. The angle generator is coupled to the step period generator, receives the step time and the rotor sensing signal, and obtains an angle detection result according to the rotor sensing signal and the step time.

The present invention provides an angle detection method for a rotor of a motor, which includes: receiving a rotor sensing signal, and calculating a plurality of time ranges of a plurality of pulses of the rotor sensing signal; generating a ratio value and an error signal according to an average time range value of the time ranges and a set value; adjusting the ratio value according to the error signal, and generating a step time according to the adjusted ratio value and the average time range value; and finally, obtaining an angle detection result according to the rotor sensing signal and the step time.

In view of the above, in the present invention the step period generator adjusts the ratio value according to the error signal, so as to dynamically adjust the step time generated according to the ratio value. The step time is dynamically adjusted, the error likely caused by the insufficient resolution of the step time can be effectively compensated for, and the accuracy of the angle detection apparatus for a rotor of a motor based on the step time can be further improved.

In order to make the aforementioned features and advantages of the present invention more comprehensible, embodiments are described in detail below with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 3:
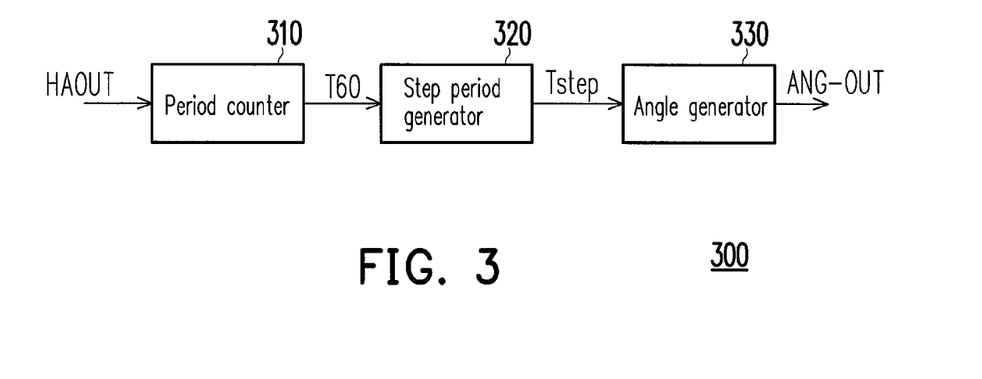
FIG. 3 is a schematic view of an angle detection apparatus 300 for a rotor of a motor according to an embodiment of the present invention.

Referring to FIG. 3, FIG. 3 is a schematic view of an angle detection apparatus 300 of a rotor of a motor according to an embodiment of the present invention. The angle detection apparatus 300 is applicable to a BLDC motor, and includes a period counter 310, a step period generator 320, and an angle generator 330. The period counter 310 receives a rotor sensing signal HAOUT, and calculates a plurality of time ranges T60 of a plurality of pulses of the rotor sensing signal HAOUT. For example, a rotation of a rotor of a motor correspondingly generates a rotor sensing signal HAOUT having seven pulses, and when the rotor rotates by each 60 degrees, the corresponding rotor sensing signal HAOUT generates a pulse, so that for each rotation of the rotor, the period counter 310 correspondingly generates six time ranges T60.

The step period generator 320 is coupled to the period counter 310, and receives the time ranges T60 generated by the period counter 310. The period counter 310 generates a ratio value and an error signal according to an average time range value of the received plurality of time ranges T60 and a set value. The set value is a preset value, and the ratio value is generated according to the average time range value and the set value. For example, a quotient obtained by dividing the average time range value by the set value may be used as the ratio value, and a remainder obtained by dividing the average time range value by the set value may be used as the error signal.

In addition, the step period generator 320 further adjusts the ratio value according to the error signal, and generates a step time Tstep according to the adjusted ratio value and the average time range value. Specifically, when the error signal is not zero (that is, when the remainder obtained by dividing the average time range value by the set value is not zero), the step period generator 320 adjusts the ratio value periodically according to the error signal, and accordingly dynamically adjusts the step time Tstep generated according to the ratio value and the average time range value. A practical example is taken for illustration. It is assumed that the average time range value is 1048, and the set value is 32. By dividing the average time range value by the set value (1,048/32), it can be obtained that the ratio value is 32, and the error signal is 24. A binary value of 24 is 11000, the two highest bits "11" are taken, and among four consecutive ratio values used to calculate the step time Tstep, one ratio value may be set to 32, and the other three ratio values may be set to 32+1=33.

In the above example, the adjustment of the ratio value is performed by adding a preset adjustment value to the quotient obtained by dividing the average time range value by the set value, in which the preset adjustment value may be 1.

The angle generator 330 is coupled to the step period generator 320. The angle generator 330 receives the step time Tstep generated by the step period generator 320, and performs counting by using a clock signal having the cycle time equal to the step time Tstep according the rotor sensing signal HAOUT, so as to obtain an angle detection result ANG-OUT of the rotor of the motor. By the way, the angle of the rotor of the motor definitely ranges from 0 degree to 360 degrees, so that the angle generator 330 may perform a reset action according to the rotor sensing signal HAOUT.

Figure 4:
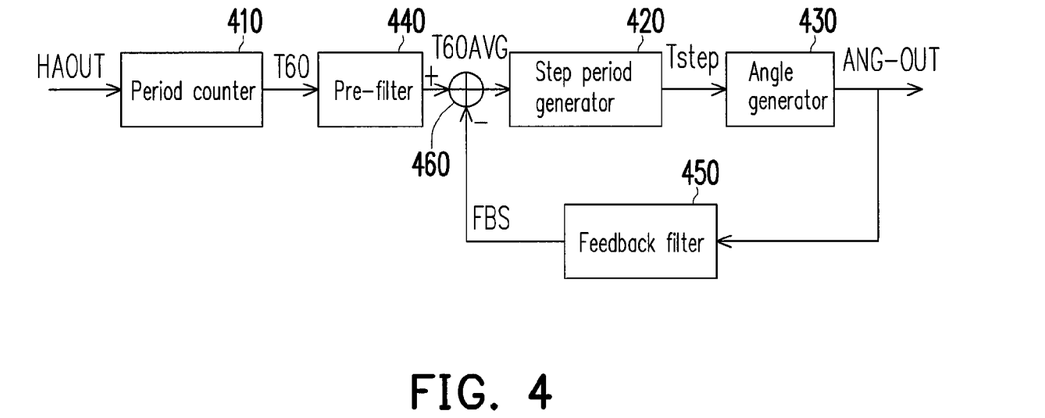
FIG. 4 is a schematic view of an angle detection apparatus 400 according to another embodiment of the present invention.

Referring to FIG. 4, FIG. 4 is a schematic view of an angle detection apparatus 400 according to another embodiment of the present invention. The angle detection apparatus 400 includes a period counter 410, a pre-filter 440, a calculator 460, a step period generator 420, an angle generator 430, and a feedback filter 450. The period counter 410 receives a rotor sensing signal HAOUT, and calculates a plurality of time ranges T60 of a plurality of pulses of the rotor sensing signal HAOUT. The pre-filter 440 is coupled to the period counter 410, and receives the plurality of time ranges T60 generated by the period counter 410. The pre-filter 440 calculates an average value of the plurality of time ranges T60 to obtain an average time range value T60AVG. The pre-filter 440 may calculate the average value according to two, three, or four (or more) consecutive time ranges T60, and obtain the average time range value T60AVG.

The calculator 460 is coupled between the pre-filter 440 and the step period generator 420, and the calculator 460 is coupled to the feedback filter 450. The calculator 460 receives a feedback angle detection result FBS generated by the feedback filter 450 and the average time range value T60AVG, so as to perform a subtraction action. In this embodiment, the calculator 460 is a subtractor, and forms a negative feedback structure with the feedback filter 450, so as to drive the angle detection apparatus 400 to generate a steady angle detection result ANG-OUT by converging.

Operation manners of the step period generator 420 and the angle generator 430 are the same as those of the step period generator 320 and the angle generator 330 in the aforementioned embodiment, and are not repeated hereinafter. The feedback filter 450 receives the angle detection result ANG-OUT, and calculates an average value of a plurality of angle detection results ANG-OUT of different times to generate the feedback angle detection result FBS.

Figure 5:
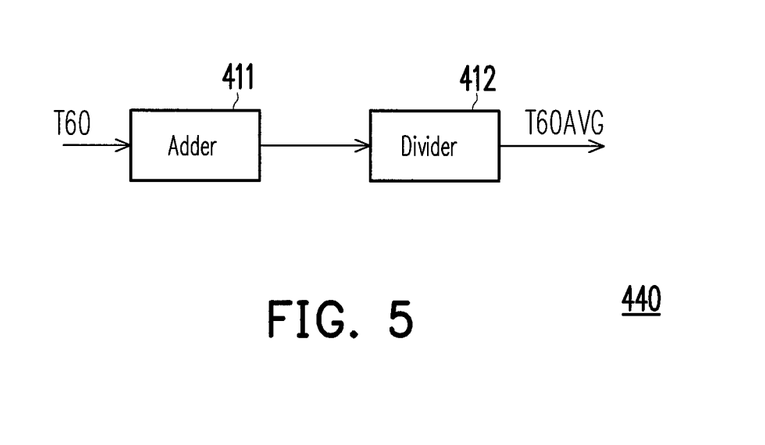
FIG. 5 illustrates an implementation of a pre-filter 440.

Referring to FIG. 5, FIG. 5 illustrates an implementation of the pre-filter 440. In this embodiment, the pre-filter 440 includes an adder 411 and a divider 412. The adder 411 is coupled to the period counter 410, receives the plurality of time ranges T60 transmitted in sequence, and selects P selected time ranges from the plurality of different time ranges T60 to perform an addition operation, where P is an integer greater than 1. The divider 412 is coupled to the adder 411, divides a sum of the P selected time ranges and calculated by the adder 411 by P, and accordingly obtains an average time range value, where P may be 2, 3, 4, or other values.

Figure 6:
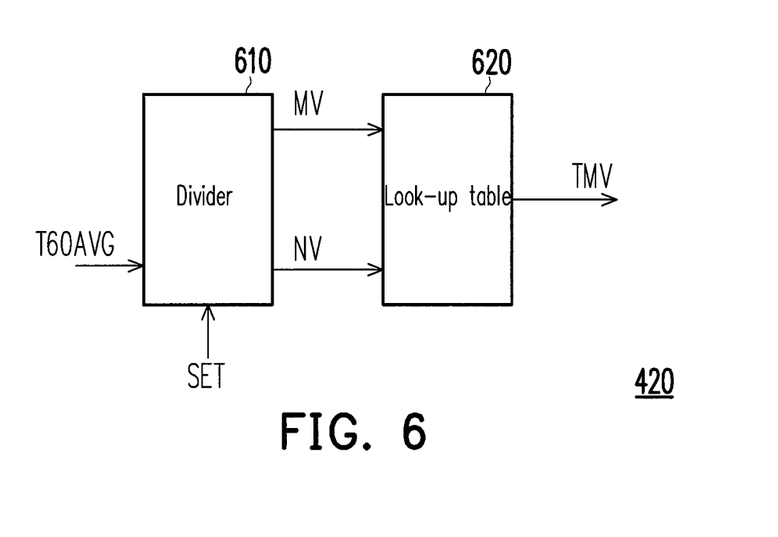
FIG. 6 is a schematic view of an implementation of a step period generator 420 according to an embodiment of the present invention.

Referring to FIG. 6, FIG. 6 is a schematic view of an implementation of the step period generator 420 according to an embodiment of the present invention. The step period generator 420 includes a divider 610 and a look-up table 620. The divider 610 receives the average time range value T60AVG and a set value SET. The divider 610 performs a division operation on the average time range value T60AVG with the set value SET (the average time range value T60AVG is divided by the set value SET). The divider 610 uses a quotient generated by the division operation as a ratio value MV, and generates an error signal NV according to a remainder generated by the division operation. The divider 610 may generate the error signal NV according to a plurality of selected highest bits of the remainder generated by the division operation.

The look-up table 620 is coupled to the divider 610, which is used to receive the ratio value MV and the error signal NV, and generates an adjusted ratio value TMV. The look-up table 620 records a mapping relationship between the error signals NV and ratio values of various periods. That is to say, the look-up table 620 records adjusted ratio values TMV that shall be generated in each period with respect to various error signals NV. For example, if the error signal NV is generated by using two highest bits of the remainder generated by the division operation, data recorded by the look-up table 620 is as shown in Table 1.

TABLE 1

| Error signal NV | Ratio value TMV | Ratio value TMV | Ratio value TMV | Ratio value TMV |
|---|---|---|---|---|
| 00 | MV | MV | MV | MV |
| 01 | MV | MV | MV | MV + 1 |
| 10 | MV | MV + 1 | MV | MV + 1 |
| 11 | MV | MV + 1 | MV + 1 | MV + 1 |

Definitely, the error signal NV may also be generated by using three highest bits of the remainder generated by the division operation, and data recorded by the look-up table 620 is as shown in Table 2.

TABLE 2

| Error signal NV | Ratio value TMV | Ratio value TMV | Ratio value TMV | Ratio value TMV | Ratio value TMV | Ratio value TMV | Ratio value TMV | Ratio value TMV |
|---|---|---|---|---|---|---|---|---|
| 000 | MV | MV | MV | MV | MV | MV | MV | MV |
| 001 | MV | MV | MV | MV | MV | MV | MV | MV + 1 |
| 010 | MV | MV | MV | MV + 1 | MV | MV | MV | MV + 1 |
| 011 | MV | MV + 1 | MV | MV | MV + 1 | MV | MV | MV + 1 |
| 100 | MV | MV + 1 | MV | MV + 1 | MV | MV + 1 | MV | MV + 1 |
| 101 | MV | MV + 1 | MV + 1 | MV | MV + 1 | MV + 1 | MV | MV + 1 |
| 110 | MV | MV + 1 | MV + 1 | MV + 1 | MV | MV + 1 | MV + 1 | MV + 1 |
| 111 | MV | MV + 1 | MV + 1 | MV + 1 | MV + 1 | MV + 1 | MV + 1 | MV + 1 |

It can be seen from Table 1 and Table 2 that the number of the bits of the error signal NV may determine the length of the period, and in a period the number of the adjusted ratio values TMV being different from the original ration values is just equal to the value of the error signal NV.

Definitely, Table 1 and Table 2 are only exemplary, and the number of the bits of the error signal NV may be greater, and is not limited to 2 or 3.

Figure 7:
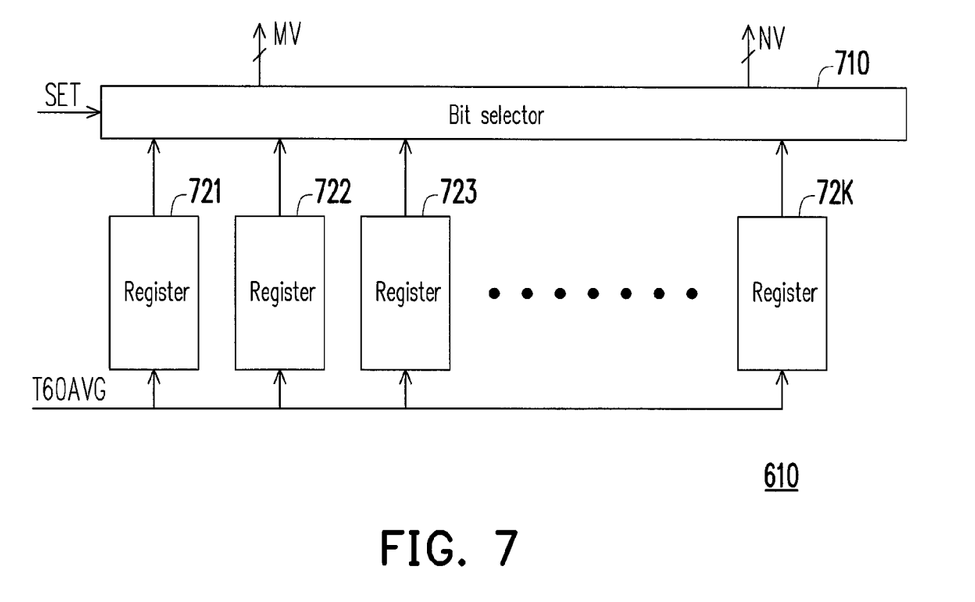
FIG. 7 illustrates an implementation of a divider 610 according to an embodiment of the present invention.

Referring to FIG. 7, FIG. 7 illustrates an implementation of the divider 610 according to an embodiment of the present invention. In this implementation, the divider 610 includes a bit selector 710, and the average time range value T60AVG is stored in a plurality of registers 721 to 72K in a binary manner. When the set value SET is equal to $2^M$, the bit selector 710 selects M lowest bits of the data stored in the registers 721 to 72K according to the set value SET, so as to generate the remainder to be generated by the divider 610. Furthermore, the bit selector 710 selects the rest K-M bits to generate the quotient to be generated by the divider 610. Furthermore, the bit selector 710 makes the generated quotient be equal to the ratio value MV, and selects several highest bits of the generated remainder to generate the error signal NV.

Figure 8:
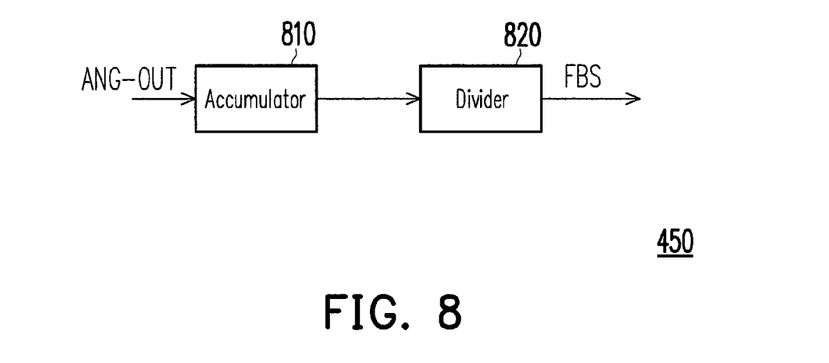
FIG. 8 illustrates an implementation of a feedback filter 450 according to an embodiment of the present invention.

Referring to FIG. 8, FIG. 8 illustrates an implementation of the feedback filter 450 according to an embodiment of the present invention. The feedback filter 450 includes an accumulator 810 and a divider 820. The accumulator 810 is used to receive and add angle detection results ANG-OUT of Q different time periods, so as to obtain a sum, where Q is an integer greater than 1. The divider 820 is coupled to the accumulator 810. The divider 820 divides the sum by Q to generate a feedback angle detection result FBS.

The angle detection apparatus according to the embodiment of the present invention is described below in a wave form manner, so as to enable those skilled in the art to better understand the features of the present invention.

Figure 9:
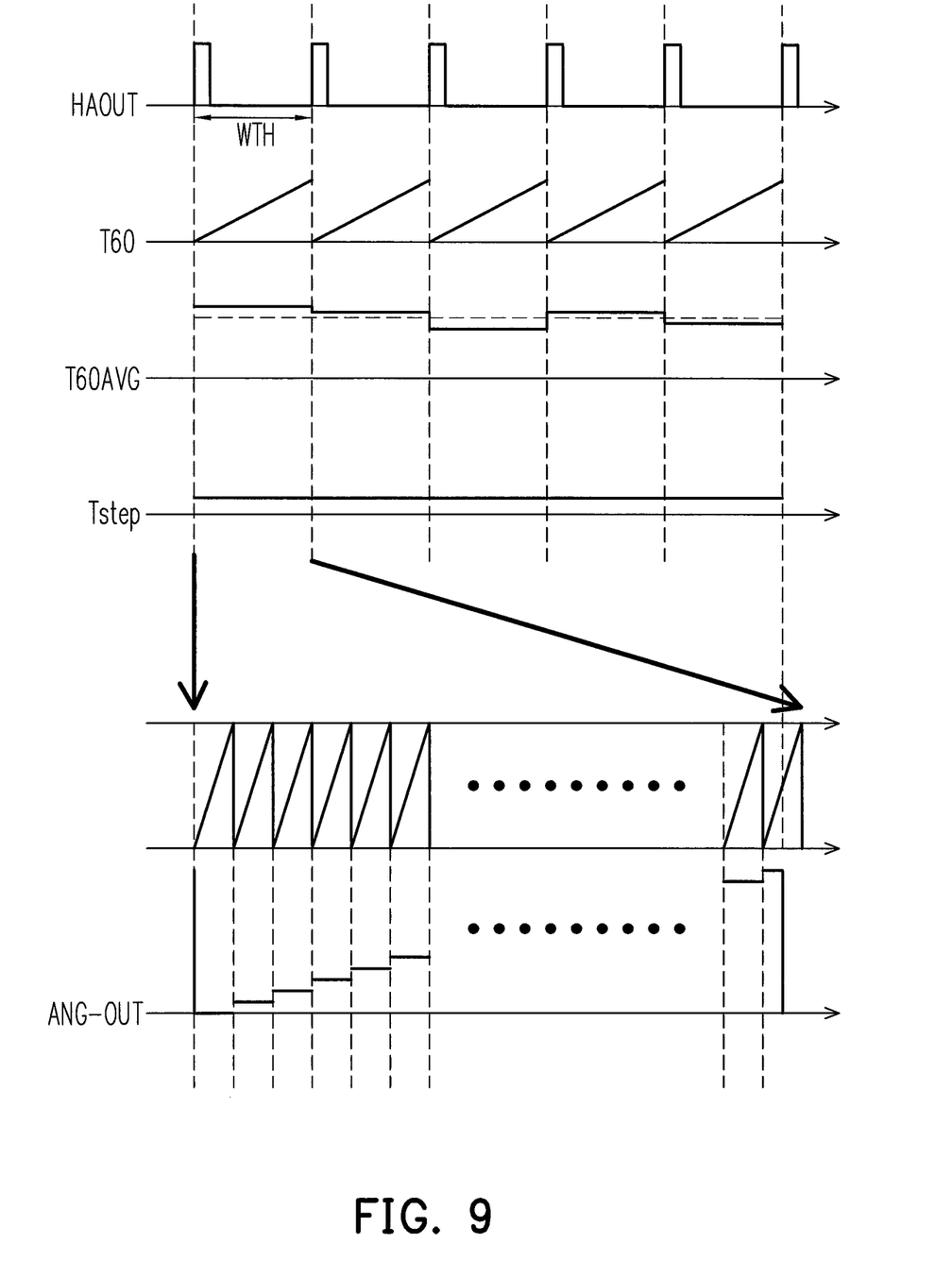
FIG. 9 is a schematic oscillogram of an angle detection apparatus according to an embodiment of the present invention.

Referring to FIG. 9, FIG. 9 is a schematic oscillogram of the angle detection apparatus according to the embodiment of the present invention. As shown in FIG. 9, a distance between two adjacent pulses of a rotor sensing signal HAOUT is a range WTH, and a time range T60 can be obtained by calculating the distance between each two adjacent pulses of the rotor sensing signal HAOUT being the range WTH. An average time range value T60AVG can be calculated according to a plurality of time ranges T60. A step time Tstep can be obtained by performing a division operation on the average time range value T60AVG with a set value. Furthermore, counting for an angle detection result ANG-OUT is performed by using a clock having the cycle time equal to the step time Tstep. In the case that the step time Tstep is dynamically adjusted according to an error signal, an error generated because the range WTH cannot be divided by the step time Tstep with no remainder can be effectively compensated for. Therefore, the angle detection result ANG-OUT acquired by performing counting by using the clock having the cycle time equal to the step time Tstep is more accurate.

Figure 10:
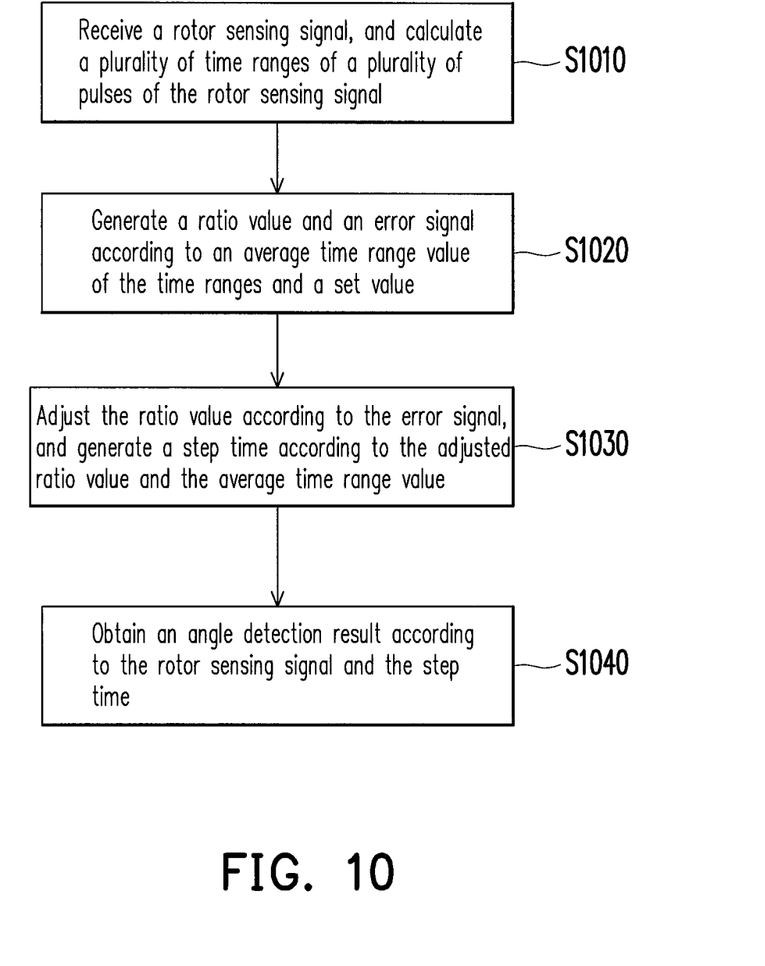
FIG. 10 is a flow chart of an angle detection method for a rotor of a motor according to an embodiment of the present invention.

Referring to FIG. 10, FIG. 10 is a flow chart of an angle detection method for a rotor of a motor according to an embodiment of the present invention. First, a rotor sensing signal is received, and a plurality of time ranges of a plurality of pulses of the rotor sensing signal is calculated (S1010). Second, a ratio value and an error signal are generated according to an average time range value of the time ranges and a set value (S 1020). Third, the ratio value is adjusted according to the error signal, and a step time is generated according to the adjusted ratio value and the average time range value (S1030). Finally, an angle detection result is obtained according to the rotor sensing signal and the step time (S 1040). Details of the implementation of the angle detection of the rotor of the motor according to the embodiment of the present invention are provided in the aforementioned plurality of embodiments and implementations, and are not repeated hereinafter.

In view of the above, in the present invention, the error signal is used to dynamically adjust the ratio value, the dynamically adjusted ratio value is used to correspondingly generate the step time, and the step time is dynamically adjusted to perform the angle counting action of the rotor of the motor, so as to make the obtained angle detection result more accurate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An angle detection apparatus for a rotor of a motor, comprising:
    a period counter, for receiving a rotor sensing signal and calculating a plurality of time ranges of a plurality of pulses of the rotor sensing signal;
    a step period generator, coupled to the period counter for generating a ratio value and an error signal according to an average time range value of the time ranges and a set value, wherein the step period generator further adjusts the ratio value according to the error signal, and generates a step time according to the adjusted ratio value and the average time range value; and
    an angle generator, coupled to the step period generator and for receiving the step time and the rotor sensing signal and obtaining an angle detection result according to the rotor sensing signal and the step time.

2. The angle detection apparatus according to claim 1, further comprising:

a pre-filter, coupled on a coupling path of the step period generator and the period counter, wherein the pre-filter receives the time ranges, and generates the average time range value.

3. The angle detection apparatus according to claim 2, wherein the pre-filter selects a plurality of time ranges from the time ranges to perform averaging, so as to generate the average time range value.

4. The angle detection apparatus according to claim 3, wherein the pre-filter comprises:
   an adder, coupled to the period counter and for calculating a sum of P selected time ranges of the time ranges, wherein P is an integer greater than 1; and
   a divider, coupled to the adder and the step period generator and for generating the average time range value by dividing the selected time ranges by P.

5. The angle detection apparatus according to claim 1, wherein the step period generator increases a preset adjustment value according to the error signal to adjust the ratio value.

6. The angle detection apparatus according to claim 1, wherein the step period generator divides the average time range value by the set value to generate the ratio value and the error signal.

7. The angle detection apparatus according to claim 6, wherein the step period generator comprises:
   a divider, coupled to the period counter and for performing a division operation on the average time range value with the set value, wherein the division operation generates a quotient being the ratio value, the error signal is generated according to a remainder generated by the division operation, and the set value is a positive integer greater than 1.

8. The angle detection apparatus according to claim 7, wherein the step period generator takes N highest bits of the remainder generated by the division operation as the error signal, and N is an integer greater than 1.

9. The angle detection apparatus according to claim 7, wherein the divider comprises:
   a bit selector, wherein the bit selector takes M lowest bits of the average time range value as the remainder and takes the rest bits of the average time range value as the quotient, the set value is equal to $2^M$, and M is an integer greater than 1.

10. The angle detection apparatus according to claim 7, wherein the step period generator further comprises:
   a look-up table, coupled to the divider, wherein the look-up table records a mapping relationship between the error signals NV and ratio values of various periods,
   wherein, the step period generator obtains ratio values of various periods from the look-up table according to the error signals.

11. The angle detection apparatus according to claim 1, further comprising:
   a calculator, coupled on a coupling path of the period counter and the step period generator, and for receiving the average time range value and a feedback angle detection result and calculating a difference between the average time range value and the feedback angle detection result; and
   a feedback filter, for calculating an average value of the angle detection results of a plurality of different time periods, so as to generate the feedback angle detection result.

12. The angle detection apparatus according to claim 11, wherein the feedback filter comprises:
   an accumulator, for receiving and adding the angle detection results of Q different time periods, so as to obtain a sum, wherein Q is an integer greater than 1; and
   a divider, coupled to the accumulator, and for dividing the sum by Q to generate the feedback angle detection result.

13. The angle detection apparatus according to claim 1, wherein the period counter comprises:
   a sampler, for receiving a reference clock signal and the rotor sensing signal, and sampling a plurality of distances between any two adjacent pulses of the rotor sensing signal according to the reference clock signal, so as to obtain the time ranges.

14. An angle detection method for a rotor of a motor, comprising:
   receiving a rotor sensing signal and calculating a plurality of time ranges of a plurality of pulses of the rotor sensing signal;
   generating a ratio value and an error signal according to an average time range value of the time ranges and a set value;
   adjusting the ratio value according to the error signal, and generating a step time according to the adjusted ratio value and the average time range value; and
   obtaining an angle detection result according to the rotor sensing signal and the step time.

15. The angle detection method according to claim 14, further comprising:
   selecting a plurality of time ranges from the time ranges to perform averaging to generate the average time range value.

16. The angle detection method according to claim 14, wherein the step of "adjusting the ratio value according to the error signal" comprises:
   determining, according to the error signal, whether to add a preset adjustment value to adjust the ratio value.

17. The angle detection method according to claim 14, wherein the step of "generating the ratio value and the error signal according to the average time range value of the time ranges and the set value" comprises:
   generating the ratio value according to a quotient of dividing the average time range value by the set value, and generating the error signal according to a remainder of dividing the average time range value by the set value.

18. The angle detection method according to claim 17, wherein the step of "generating the ratio value and the error signal according to the average time range value of the time ranges and the set value" comprises:
   when the set value is equal to $2^M$, selecting M lowest bits of the average time range value to generate the error signal, and taking the rest bits of the average time range value to generate the ratio value being the quotient, wherein M is an integer greater than 1.

* * * * *